1,592,627

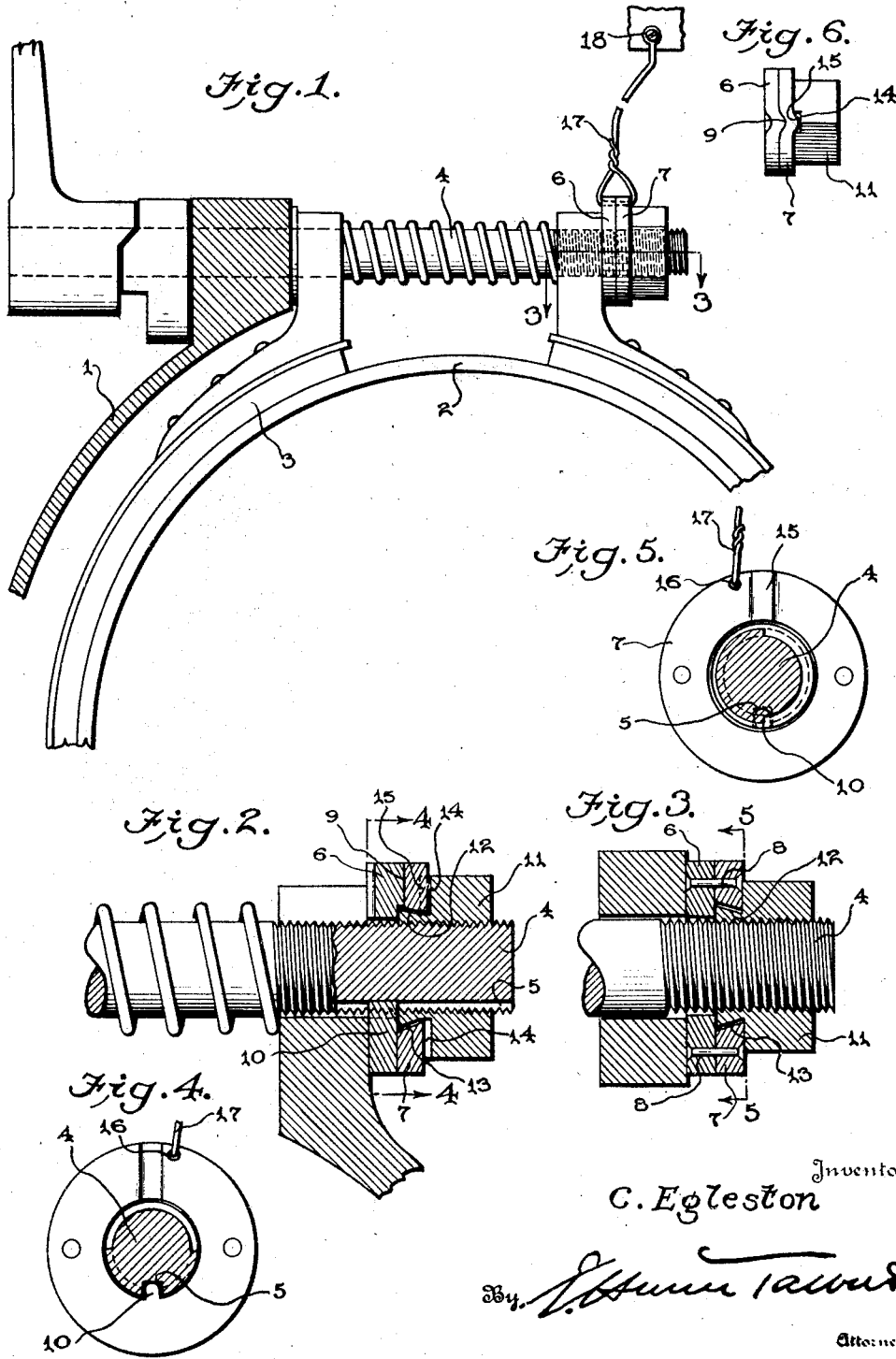
July 13, 1926.
C. EGLESTON
1,592,627
LOSS PREVENTING ATTACHMENT FOR FORD TRANSMISSION BANDS
Filed Dec. 31, 1925
Inventor
C. Egleston Patented July 13, 1926.

UNITED STATES PATENT OFFICE.

CHARLIE EGLESTON, OF COALMONT, INDIANA.

LOSS-PREVENTING ATTACHMENT FOR FORD TRANSMISSION BANDS.

Application filed December 31, 1925. Serial No. 78,722.

In changing the transmission bands of a Ford engine, it is necessary to remove the adjusting nuts and the springs and very often a repairman inadvertently loses such nuts in the transmission case which may cause trouble, and in order to avoid these difficulties it is the purpose to provide improved adjusting nuts, with means for preventing the loss of such parts at the time of changing the transmission bands.

Another purpose is to provide a pair of washers fastened together, one swivelled to the adjusting nut, the other having a keyed connection with the shaft or rod that passes through the ends of the band, in conjunction with an anchoring means to prevent the loss of the adjusting nut and the washers.

By swivelling the nut to one of the washers, it is possible to adjust the nut tightly without causing any movement of the washer, especially in view of the fact that the other washer has a keyed connection with the shaft or rod that passes through the ends of the band, said keyed connection acting to prevent rotation of the washers when adjusting the nut.

The invention comprises further features and combinations of parts to be hereinafter set forth, shown in the drawings and claimed.

In the drawings:

Figure 1 is a fragmentary elevation of a brake or reverse transmission band, illustrating the application of the invention.

Figure 2 is an enlarged sectional view through the adjusting nut and the washers and a portion of the shaft or rod to which the nut and washers are applied.

Figure 3 is a sectional view on the plane indicated by the line 3—3 of Figure 1.

Figure 4 is a sectional view on the plane indicated by the line 4—4 of Figure 2.

Figure 5 is a sectional view on the plane indicated by the line 5—5 of Figure 3.

Figure 6 is a detail view of the nut and washer.

Referring to the drawings, 1 designates a portion of the transmission case (which also connects with the crank case not shown) and 2 denotes a portion of the transmission, that is, one of the transmission drums, and 3 one of the transmission bands, while 4 designates the shaft or rod which passes through the ends of the band. This shaft or rod has a longitudinal groove 5, and 6 and 7 denote a pair of washers which are riveted together, as at 8.

These washers have an interengaging tongue and groove connection 9, acting to relieve strain on the riveted connections between the two washers, that is, if there be a strain exerted on one of the washers. The washer 6 has a radial lug 10 which engages the longitudinal groove 5 of the shaft or rod, thereby preventing the washer from rotating, and since the washer is prevented from rotating, the other washer is likewise prevented from rotating due to its riveted connection with the first washer.

A nut 11 is threaded to the shaft or rod which passes through the ends of the band, and on one face of the nut it is provided with a projection 12 which is tapered, as shown, and fits a corresponding opening 13 of the washer 7, thereby swivelly connecting the nut to the washer, allowing the nut to rotate freely on the rod or shaft, that is, until it is tightened, without turning the washer.

Adjoining the tapered projection on one face of the nut are diametrically opposite radial grooves or notches 14 which engage corresponding protuberance 15 formed upon the washer 7 for the purpose of preventing rotation of the nut after it is turned home, thereby preventing backing-off of the nut, as well as preventing backing-off of the washers, especially due to the fact that one of the washers has a keyed connection with the shaft or rod.

The idea of swivelly mounting one of the washers upon the nut is to provide a means to which an anchoring device may be attached, thereby preventing the loss of the adjusting nut when it is removed for the repair of the transmission bands and in attaching this anchoring device in this manner, the loss of the connected washers is prevented as well as the loss of the nut. To accomplish this purpose, the washers have perforations 16 which are in registration and through which an anchoring wire 17 may be engaged and made fast, the wire being, in turn, detachably attached at 18 to some suitable part of the transmission case, so that when the adjusting nut is removed from the shaft or rod which passes through the ends of the band, the nut and its washers are prevented from being lost in the transmission case.

The invention having been set forth, what is claimed is:

In a loss preventing attachment, the combination with a rod for connecting the opposed ends of a member, of united washers mounted on the rod with one having means slidably engaged with the rod and thereby preventing rotation of the washer, a nut operatively mounted on the rod and in turn swivelly connected to the other washer, whereby the nut may be adjusted without imparting movement to either of the washers, operative connections between the nut and one of the washers to prevent rotation of the nut after it is adjusted home, and anchoring means connected to the washers and in turn secured to a stationary member, thereby preventing loss of the washers and the nut.

In testimony whereof he affixes his signature.

CHARLIE EGLESTON.